Patented Mar. 6, 1934

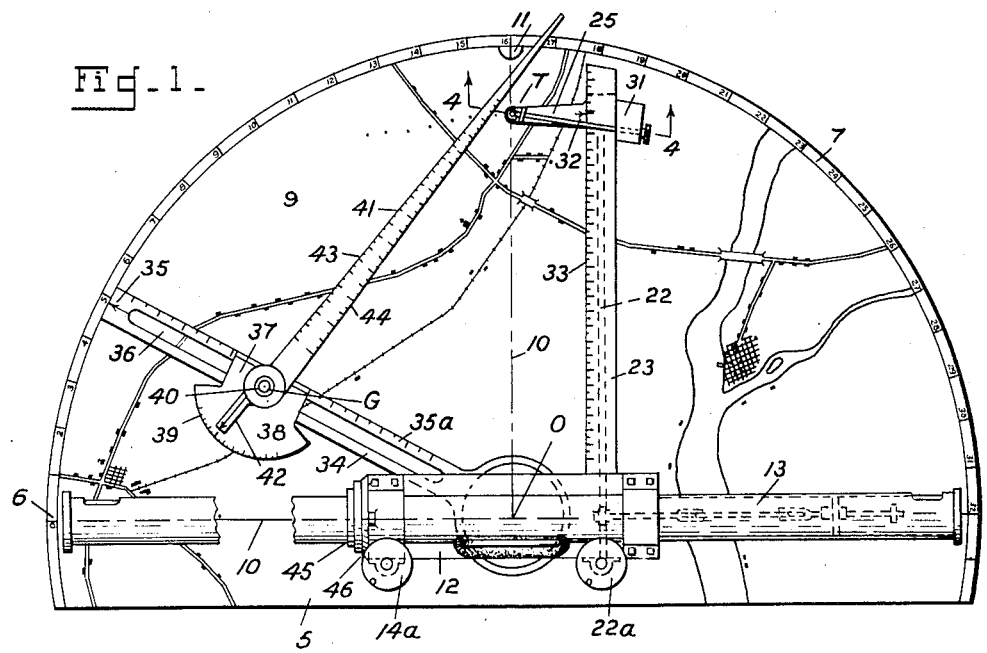

1,949,422

UNITED STATES PATENT OFFICE 1,949,422

PLOTTING DEVICE

James C. Karnes, Buffalo, N. Y.

Application June 30, 1931, Serial No. 547,974

6 Claims. (Cl. 33—67)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a plotting device especially arranged for the determination of firing data for artillery.

With a view to reducing the possibility of error and providing great flexibility with easy and rapid operation it is proposed in the present device to track the target with a range finding instrument and thereby automatically plot the course of the target. From the data thus made available the predicted future position of the target may readily be established and a gun arm adjusted to this point will afford a measure of the future range and azimuth to be applied to the gun. A novel means is also provided for determining at the observing station the angle of site from the gun to the target.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a plotting device constructed in accordance with the invention.

Fig. 2 is a view partly in rear elevation and partly in section of Fig. 1.

Fig. 3 is a detail sectional view on the line 3—3 of Fig. 2.

Fig. 4 is a detail sectional view on the line 4—4 of Fig. 1, and

Fig. 5 is a detail plan view of the actuating mechanism for the angle-measuring prism of the telemeter.

Referring to the drawing by characters of reference:

The device comprises a base plate 5 preferably circular in shape, the diameter of the circle constituting a base line 6 and the periphery inscribed with a scale 7 preferably in values of mils.

The base plate is provided with a socket 8 located centrally on the base line 6. A plotting paper or a map 9 is placed on the base plate and oriented by matching reference lines 10 on the map with the base line 6 and with reference line 11 normal to the base line so that the observing station which is located on the portion of the map that is cut away to allow for the socket will be in alignment with the center of the socket. For convenience the center of the socket is designated O.

Rotatably mounted in the socket 8 is a yoke 12 carrying a telemeter 13 rotatable about its axis in the customary manner through the gearing 14 and handwheel 14a. The telemeter also includes the usual angle-measuring prism 15, but the actuating mechanism instead of being carried entirely by the telemeter is partially carried by the yoke. The prism 15 is mounted on a travelling nut 16 on a screw shaft 17. An offset shaft 18 is universally and extensibly connected to the shaft 17 and to a shaft 19 journaled in the yoke 12. The shaft 19 carries a gear wheel 20 meshing with a gear wheel 21 on a screw shaft 22 that is perpendicular to the telemeter. The shaft 22 is journaled in the yoke and in the extremity of a target arm 23 fixed to the yoke and overlying the base plate 5. The screw shaft 22 is operated from a hand wheel 22a and gearing (not shown).

The screw shaft 22 underlies the target arm and carries a nut 24 which is held against rotation and constrained to displacement along the shaft by virtue of engagement with the range arm. The nut is provided with a laterally extending arm 25 terminating in a depending casing 26 in which is mounted a marker 27 positioned on a radius from the center O. A spring 28 normally holds the marker in an elevated position clear of the map and against a cam wheel 29 fixed on the end of a shaft 30 that is driven from a motor 31. The motor is mounted on the nut and accordingly is movable therewith. An index 32 on the nut is readable against a range scale 33 on the target arm.

A gun arm 34 having a range scale 35a is mounted on the pivot 12a of the yoke and is confined between the yoke and base plate. It is freely rotatable and adjustable to any position. The extremity of the gun arm is provided with an index 35 readable against the scale 7. A longitudinal slot 36 in the gun arm slidably receives a rib 37 on a segmental plate 38 which is provided with an azimuth scale 39. The plate has a hollow pivot 40 whose center G is on a line between the index 35 and the center O of the pivot of the gun arm. The center G of the pivot represents the gun station and inasmuch as the pivot 40 is hollow, the gun station may be readily identified or plotted on the map.

A gun-target or reading arm 41 is mounted on the hollow pivot 40 and has a finger 42 reading against the azimuth scale 39. The straight edge of the reading arm is in line with the finger and bears a range scale 43. The opposite edge which is inclined or otherwise formed to avoid confusion with the straight edge bears a scale 44 of time of flight.

Mounted on the left hand side of the telemeter adjacent the yoke are a pair of dials 45 and 46, the former being the smaller and fixed to the telemeter by means of a screw 47 and the latter being rotatably mounted on the telemeter but capable of being clamped to the fixed dial by means of a screw 48 and nut 49, the screw passing through a slot 50 in the fixed dial. The dials 45 and 46 are each provided with an angle of site scale in mils, respectively designated 51 and 52 and the dial 46 in addition is provided with an index 53 readable against the scale 51. The scale 52 is read against an index 54 provided on the stationary yoke 12.

In operation the plotting device is set up at the observing station and oriented on the base line according to a known azimuth. The gun station may be located and identified on the map or it may be plotted on the plotting paper from known data. It may also be located by ranging on it through the telemeter and in this instance the gun arm is moved perpendicular to the telemeter by reference to the peripheral scale 7 of the base plate. The range from the observing station O to gun station G being supplied by the telemeter, the plate 38 is moved in the slot 36 of the gun arm until the hollow pivot 40 is opposite the appropriate reading on the range scale 35a. The gun station which is coincident with the center of the hollow pivot is then marked on the map or plotting paper.

The angle of site from the observing station to the gun station is indicated on the dial 46 by comparing the scales 51 and 52. The dials 45 and 46 are clamped together by acting on the nut 49.

Having adjusted the gun arm the telemeter is manipulated to range on the target designated at T. The operation of the screw shaft 22 to move the angle measuring prism 15 displaces the nut 24 and positions the marker 27 at the target position on the map or plotting paper. The marker driven from the motor 31 automatically plots the course of a moving target by marking the position at known intervals of time.

In order to determine the predicted future position of the target the time of flight of the projectile and the dead time of transmitting the firing data and loading must be taken into consideration. For a given gun crew the dead time is constant. By viewing the course C of the target the operator of the gun-target arm 41 can ascertain the present time of flight factor by applying the gun arm to the present position of the target as indicated by the marker 27 or the last recorded point in the course and taking a reading from the scale 44. The distance between the recorded points on the course C represents travel of the target during a unit of time and since the time factor has been made available by the scale 44 the operator possesses sufficient data to select or calculate the predicted future position or hit point. Application of the gun target arm 41 to this point will enable him to read future range and time of flight from the scale 43 and future azimuth from the scale 39. It is to be noted that correction for parallax need not be made in the azimuth data.

In directing the telemeter on the target it will be necessary to rotate it through the handwheel 14a when the target is out of the horizontal plane. Such rotation will displace the dial 45 and the dial 46 which has been clamped thereto. By reading the scale 52 on dial 46 against the index 54 on the yoke the value of angle of site from the gun to target will be obtained.

In order that the gun may be oriented the reading of the azimuth scale 7 as given by the index 35 on the gun arm is sent to the gun station and is to be applied as a permanent correction to azimuth readings supplied from the scale 39. This correction arising out of the inclination of the gun arm with respect to the base line may be included in the azimuth data sent from the observation to the gun station.

Sufficient clearance is provided under the target arm to permit passage of the gun arm. The plate 38 carrying the arm 41 can be readily lifted out of the slot 36 in the gun arm to facilitate the adjustment.

I claim.

1. A plotting device embodying a base plate having a peripheral azimuth scale, a support rotatably mounted on the base plate, the center of rotation of the support representing an observing station, a telemeter including an angle-measuring prism carried by the support, a target arm having a range scale carried by the support and overlying the base plate, a screw shaft underlying the target arm and carried by said arm and the support, a nut on the screw shaft mounted for movement along said arm, a marker carried by the nut, means for periodically actuating the marker into contact with the base plate to graphically represent the course of a target, means for actuating the prism of the telemeter from the screw shaft, a gun arm rotatably mounted on the pivot of the support, a plate having an azimuth scale slidable on the gun arm, a hollow pivot on the plate, the center of the pivot representing a gun station, a gun target arm having a range scale and a time scale mounted on the hollow pivot, and means on the telemeter for determining angle of site from gun station to target.

2. A plotting device embodying a base plate, a support rotatably mounted on the base plate, the center of rotation of the support representing an observing station, a telemeter including an angle-measuring prism carried by the support, a target arm carried by the support and overlying the base plate, a screw shaft underlying the target arm and carried by said arm and the support, a nut on the screw shaft mounted for movement along said arm, a market carried by the nut, means for periodically actuating the marker into contact with the base plate to graphically represent the course of a target, means for actuating the prism of the telemeter from the screw shaft, a gun arm rotatably mounted on the pivot of the support, a plate having an azimuth scale slidable on the gun arm, a hollow pivot on the plate, the center of the pivot representing a gun station, and a gun-target arm having a range scale and a time scale mounted on the hollow pivot.

3. A plotting device embodying a base plate, a support rotatably mounted on the base plate, the center of the rotation of the support representing an observing station, a telemeter including an angle-measuring prism carried by the support, a target-course marker movable with the support, a common means for actuating the marker and prism whereby the marker is positioned relative to the represented observing station in accordance with range, a gun arm rotatably mounted for movement about the pivot of the support as a center, a plate having an azimuth scale slidable on the gun arm, a gun-target arm rotatably mounted on said plate, the center of rotation of the arm representing a gun station.

4. A plotting device embodying a base plate, a support rotatably mounted on the base plate, the center of rotation of the support representing an observing station, a telemeter including an angle-measuring prism carried by the support, a target-course marker movable with the support, means for actuating the marker and prism whereby the marker is positioned relative to the represented observing station in accordance with range, and means pivotally carried by the support for locating on the base plate a gun station with relation to the observing station.

5. A plotting device embodying a base plate, a support rotatably mounted on the base plate, the center of rotation of the support representing an observing station, a telemeter including an angle-measuring prism carried by the support, a target arm having a range scale carried by the support and overlying the base plate, a screw shaft movable with the target arm, a nut on the screw shaft mounted for movement along said arm, a marker carried by the nut, and means for actuating the prism of the telemeter from the screw shaft.

6. A plotting device embodying a base plate, a support rotatably mounted thereon, the center of rotation representing an observing station, a telemeter including an angle-measuring prism carried by the support, a target-course marker movable with the support, and means for actuating the market and prism whereby the marker is positioned relative to the represented observing station in accordance with range.

JAMES C. KARNES.